(12) United States Patent
Lu

(10) Patent No.: US 8,199,421 B2
(45) Date of Patent: Jun. 12, 2012

(54) AUTO-FOCUSING LENS DRIVING DEVICE

(75) Inventor: Chun Yi Lu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 76 days.

(21) Appl. No.: 12/893,919

(22) Filed: Sep. 29, 2010

(65) Prior Publication Data

US 2012/0002308 A1 Jan. 5, 2012

(30) Foreign Application Priority Data

Jul. 2, 2010 (TW) .............................. 99121796 A

(51) Int. Cl.
 *G02B 7/02* (2006.01)
(52) U.S. Cl. ........................ 359/824; 359/811
(58) Field of Classification Search .......... 359/694–697; 396/79, 885, 529, 85; 348/345, 374, 376
See application file for complete search history.

(56) References Cited

U.S. PATENT DOCUMENTS

| | | | | |
|---|---|---|---|---|
| 7,573,660 | B2* | 8/2009 | Chang | 359/822 |
| 7,978,421 | B2* | 7/2011 | Im et al. | 359/694 |
| 8,009,373 | B2* | 8/2011 | Sata et al. | 359/824 |

* cited by examiner

*Primary Examiner* — Mohammed Hasan
(74) *Attorney, Agent, or Firm* — Morris Manning & Martin LLP; Tim Tingkang Xia, Esq.

(57) ABSTRACT

This invention provides an auto-focusing lens driving device having a movable member, the movable member comprising: a cylinder-shaped lens carrier whose exterior is wound with a coil and whose interior defines a hollow portion for receiving an optical system; and two separate conductive elastic pieces which are each disposed at one side of the cylinder-shaped lens carrier along an optical axis; wherein each one of the two ends of the coil is micro-welded and joined to a corresponding one of the two conductive elastic pieces by thermal pressing technique, and a thermal pressing region having an area of less than 1 mm$^2$ is formed at the end of the coil.

2 Claims, 4 Drawing Sheets ated by the claims appended hereto.

AUTO-FOCUSING LENS DRIVING DEVICE

CROSS-REFERENCE TO RELATED APPLICATIONS

This non-provisional application claims priority under 35 U.S.C. §119(a) on Patent Application No(s). 099121796 filed in Taiwan, R.O.C. on Jul. 2, 2010, the entire contents of which are hereby incorporated by reference.

BACKGROUND OF THE INVENTION

1. Field of the Invention

The present invention relates to an auto-focusing lens driving device, and more particularly, to an auto-focusing lens driving device applicable to photographing modules.

2. Description of the Prior Art For many electronic devices with the photographing function, such as a camera-embedded mobile phone and a camera with an auto-focus module, the installation of an auto-focusing lens driving device therein is required. Among the most commonly employed auto-focusing lens driving devices is the voice coil motor (VCM). The voice coil motor is suitable for use as a short-range microactuator for electronic devices due to its inexpensive price and its capability of effecting precise movements.

FIGS. 1 and 2 are side and rear views, respectively, of a prior art auto-focusing lens driving device 11. The auto-focusing lens driving device 11 comprises a cylinder-shaped lens carrier 12 whose exterior is wounded with a coil 13 and whose interior defines a hollow portion for receiving a lens assembly 14 and two separate conductive elastic pieces 15, each of which is disposed at one side of the cylinder-shaped lens carrier 12 along an optical axis (the conductive elastic piece disposed at the front side of the auto-focusing lens driving device 11 is not shown).

FIG. 3 is a sectional view of FIG. 2 taken along the line I-I, and FIG. 4 is an enlarged view of Section A of FIG. 2. The coil 13 of the auto-focusing lens driving device 11 conducts electricity supplied from an external power source via the conductive elastic pieces 15 disposed at two sides of the cylinder-shaped lens carrier 12. Each one of the two ends of the coil 13 is joined to a corresponding one of the two conductive elastic pieces 15 by soldering technique. During the soldering process, each one of the two ends of the coil 13 must be presoldered before being soldered with solders 16 to a corresponding one of the two conductive elastic pieces 15. Problems incident to the use of prior art soldering technique are as follows: 1. as the heat radiating soldering iron is situated away from the application area, the thermal conductivity is low; 2. the use of flux during the soldering process may add to the difficulty of cleanup and reduce the yield rate of the workpiece; 3. as the viscous molten solder cannot be controlled effectively, the workpiece's quality may be adversely affected; 4. the area affected by the dissipated heat is large, causing damages to the workpiece easily. For example, dissipation of heat from the soldering iron to the conductive elastic pieces 15 may cause deterioration of the conductive elastic pieces 15. Therefore, a need exists in the art for an improved auto-focusing lens driving device which can overcome the aforementioned drawbacks in the prior art.

SUMMARY OF THE INVENTION

The present invention provides an auto-focusing lens driving device having a movable member, the movable member comprising: a cylinder-shaped lens carrier whose exterior is wound with a coil and whose interior defines a hollow portion for receiving an optical system; and two separate conductive elastic pieces which are each disposed at one side of the cylinder-shaped lens carrier along an optical axis; wherein each one of the two ends of the coil is micro-welded and joined to a corresponding one of the two conductive elastic pieces by thermal pressing technique, and a thermal pressing region having an area of less than 1 mm² is formed at the end of the coil.

In the present invention, each one of the two ends of the coil is joined to a corresponding one of the two conductive elastic pieces by thermal pressing technique. Such a thermal pressing technique requires a low heating power and a relatively small area to be heated so that the workpiece can be prevented from damages. Moreover, the thermal pressing technique may be performed without the use of flux, thereby increasing the yield rate of the workpiece and dispensing with the cleaning process.

Furthermore, each one of the two ends of the coil is joined to a corresponding one of the two conductive elastic pieces by thermal pressing technique so that a thermal pressing region formed at the end of the respective coil may be restricted to be less than 1 mm². Consequently, the precision of the joint structures formed by the coil and the conductive elastic pieces can be easily controlled.

DETAILED DESCRIPTION OF THE PREFERRED EMBODIMENTS

Preferred embodiments of the present invention will be described in the following paragraphs by referring to the accompanying drawings.

Figure 2:
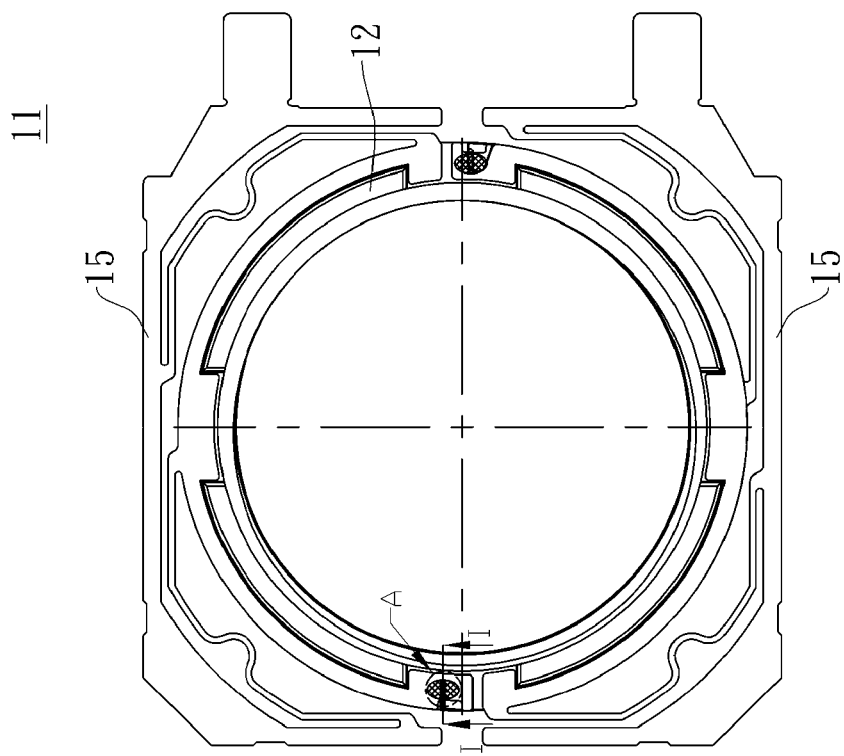
FIG. 2 is a rear view of the prior art auto-focusing lens driving device.
Figure 1:
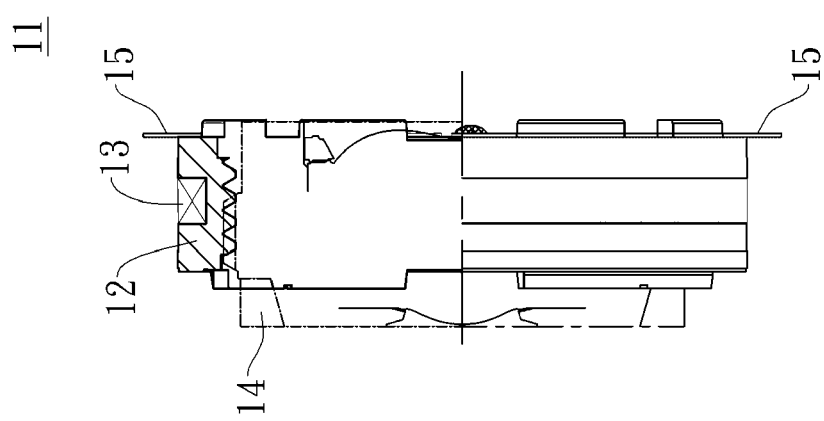
FIG. 1 is a side view of a prior art auto-focusing lens driving device.
Figure 4:
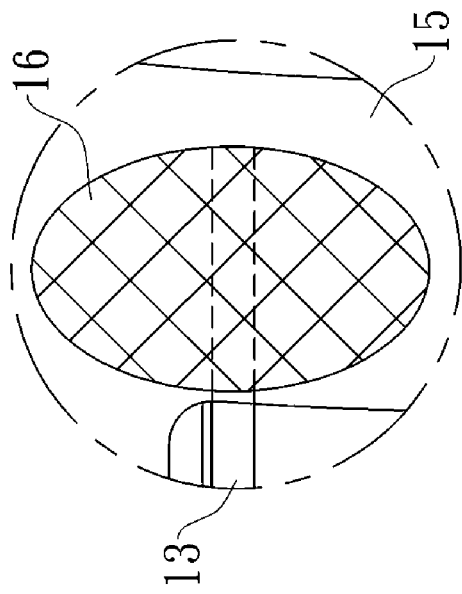
FIG. 4 is an enlarged view of Section A of FIG. 2.
Figure 3:
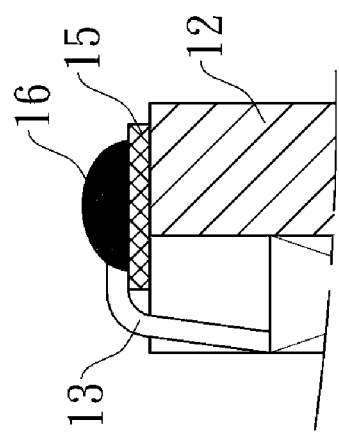
FIG. 3 is a sectional view of FIG. 2 taken along the line I-I.
Figure 6:
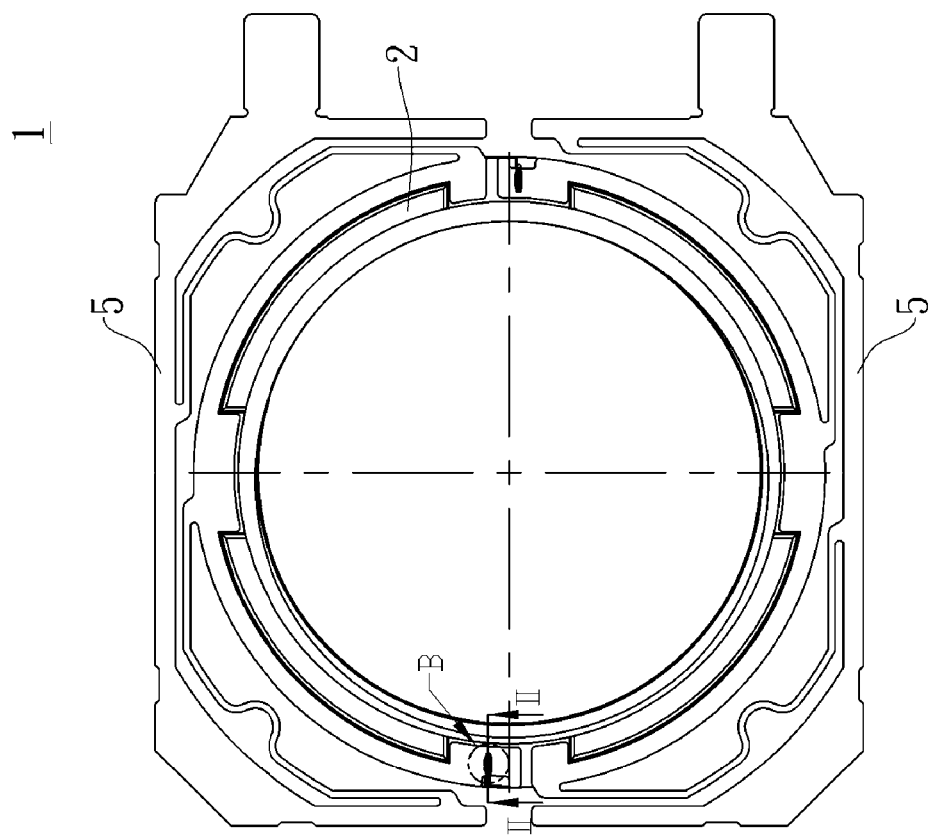
FIG. 6 is a rear view of the auto-focusing lens driving device of the present invention.
Figure 5:
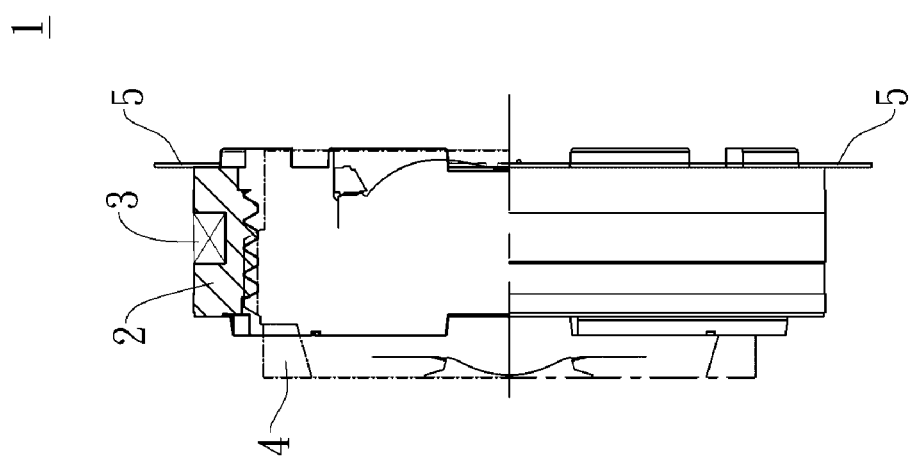
FIG. 5 is a side view of an auto-focusing lens driving device of the present invention.
Figure 7:
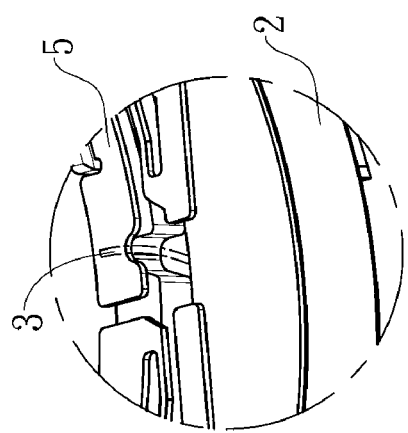
FIG. 7 is an enlarged block diagram of Section B of FIG. 6.

FIGS. 5 and 6 are side and rear views, respectively, of an auto-focusing lens driving device 1 of the present invention, and FIG. 7 is an enlarged block diagram of Section B of FIG. 6. In this embodiment, the auto-focusing lens driving device 1 employs a voice coil motor to drive a lens assembly to perform auto-focusing. The auto-focusing lens driving device 1 comprises a movable member and a stationary member (not shown) comprising a housing, a yoke made of magnetic substances, such as soft iron, and disposed inside the housing and a permanent magnet disposed at the inner side wall of the yoke. As the stationary member is a prior art structure commonly employed in the voice coil motor, the components thereof are omitted from the drawings to simplify the illustration of the present auto-focusing lens driving device. Moreover, the description as to how the voice coil motor is driven will not be detailed. The movable member of the auto-focusing lens driving device 1, which is associated with the stationary member, comprises a cylinder-shaped lens carrier 2 which defines a hollow portion for receiving an optical system, such as a lens assembly 4, a coil 3, such as a coil of enameled wire, wound around the exterior of the cylinder-shaped lens carrier 2 and associated with the permanent magnet of the stationary member and two separate conductive elastic pieces 5, such as plate springs, which are each disposed at one side of the lens carrier along an optical axis. FIG. 5 merely illustrates the conductive elastic piece 5 disposed at the rear side of the lens carrier 2 while the conductive elastic piece 5 disposed at the front side of the lens carrier 2 is not shown.

Figure 9:
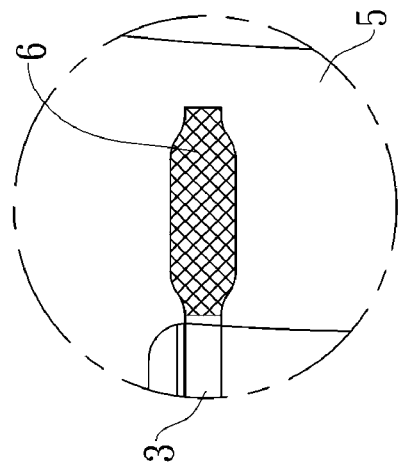
FIG. 9 is an enlarged view of Section B of FIG. 6.
Figure 8:
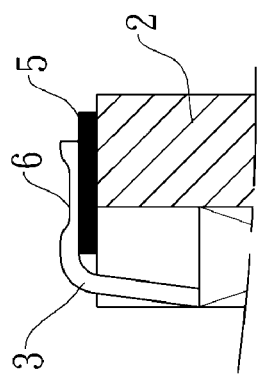
FIG. 8 is a sectional view of FIG. 6 taken along the line II-II.

Referring to FIG. 7, each one of the two ends of the coil 3 penetrates a corresponding one of the two conductive elastic pieces 5 and is joined thereto. FIG. 8 is a sectional view of FIG. 6 taken along the line II-II, and FIG. 9 is an enlarged view of Section B of FIG. 6. Referring to FIGS. 7-9, each one of the two ends of the coil 3 is micro-welded and joined to a corresponding one of the two conductive elastic pieces 5 by thermal pressing technique, and a thermal pressing region 6 having an area of less than 1 $mm^2$ is formed at the end of the coil.

Regarding the thermal pressing technique employed in the present invention, each one of the two ends of the coil 3 is micro-welded and joined to the underlying conductive elastic piece 5 via a briefly applied thermal source, and a thermal pressing region 6 with an area less than 1 $mm^2$ is formed at the end of the coil. Consequently, the precision of the joint structures formed by the coil 3 and the conductive elastic pieces 5 can be easily controlled. Moreover, the thermal pressing technique of the present invention requires a low heating power and a relatively small area to be heated so that the workpiece can be prevented from damages. Furthermore, the thermal pressing technique of the present invention can be performed without the use of flux, thereby increasing the yield rate of the workpiece and dispensing with the cleaning process.

The embodiments of the present invention described hereinbefore are exemplary and are not intended to limit the scope of the present invention. It is apparent that modifications and alterations made to the present invention without departing from the spirit of the present invention are to be considered as within the appended claims.

What is claimed is:

1. An auto-focusing lens driving device having a movable member, the movable member comprising:
    a cylinder-shaped lens carrier which defines a hollow portion for receiving an optical system;
    a coil wound around an exterior of the cylinder-shaped lens carrier, wherein the coil has a thermal pressing region with an area less than 1 $mm^2$; and
    two separate conductive elastic pieces which are each disposed at one side of the lens carrier along an optical axis;
    wherein each one of the two ends of the coil is micro-welded and joined to a corresponding one of the two conductive elastic pieces by thermal pressing technique.

2. The auto-focusing lens driving device according to claim 1, wherein the coil is a coil of enameled wire.

* * * * *